US012701369B2

(12) United States Patent
Pedersen et al.

(10) Patent No.: US 12,701,369 B2
(45) Date of Patent: Aug. 4, 2026

(54) HEARING AID COMPRISING A SPEAKER UNIT

(71) Applicant: Oticon A/S, Smørum (DK)

(72) Inventors: Michael Syskind Pedersen, Smørum (DK); Rasmus Lundgaard Christensen, Smørum (DK); Fares El-Azm, Smørum (DK); Adam Kuklasiński, Smørum (DK); Gerard Encina Llamas, Smørum (DK); Svend Oscar Petersen, Smørum (DK)

(73) Assignee: Oticon A/S, Smørum (DK)

( * ) Notice: Subject to any disclaimer, the term of this patent is extended or adjusted under 35 U.S.C. 154(b) by 241 days.

(21) Appl. No.: 18/474,267

(22) Filed: Sep. 26, 2023

(65) Prior Publication Data

US 2024/0114296 A1 Apr. 4, 2024

(30) Foreign Application Priority Data

Oct. 4, 2022 (EP) .................................... 22199477

(51) Int. Cl.
*H04R 25/00* (2006.01)

(52) U.S. Cl.
CPC ......... *H04R 25/453* (2013.01); *H04R 25/405* (2013.01); *H04R 25/407* (2013.01); *H04R 25/604* (2013.01); *H04R 25/656* (2013.01); *H04R 2225/0216* (2019.05)

(58) Field of Classification Search
CPC .. H04R 25/453; H04R 25/405; H04R 25/407; H04R 25/604; H04R 25/656; H04R 2225/0216
USPC .......................................................... 381/318
See application file for complete search history.

(56) References Cited

U.S. PATENT DOCUMENTS

| | | | | | |
|---|---|---|---|---|---|
| 6,072,884 | A * | 6/2000 | Kates | H04R 25/453 381/71.8 |
| 2013/0170680 | A1 * | 7/2013 | Gran | H04R 25/405 381/313 |
| 2014/0185849 | A1 * | 7/2014 | Ma | H04R 25/453 381/318 |
| 2016/0057548 | A1 * | 2/2016 | Wurzbacher | H04R 25/45 381/318 |
| 2017/0142527 | A1 | 5/2017 | Pedersen et al. | |
| 2017/0180879 | A1 * | 6/2017 | Petersen | H04R 25/453 |
| 2020/0322736 | A1 * | 10/2020 | Petersen | H04R 25/453 |

* cited by examiner

*Primary Examiner* — Suhan Ni

(57) ABSTRACT

Disclosed herein are embodiments of a hearing aid adapted to be worn at an ear of a user including one or more microphones and a processor configured to apply one or more processing algorithms. The processor can include a feedback control system for estimating a feedback path. The processor can be configured to estimate a speaker unit size in dependence of an estimated feedback path, wherein the feedback path is estimated while said hearing aid is located in a specific position away from the user's head. A method of operating a hearing aid is further disclosed.

7 Claims, 8 Drawing Sheets

HEARING AID COMPRISING A SPEAKER UNIT

TECHNICAL FIELD

The present applicant relates to the field of hearing aids, in particular to a hearing aid comprising a speaker unit, e.g. an interchangeable speaker unit. The disclosure comprises a scheme for personalizing parameters of a directional system (beamforming).

While fitting a hearing instrument, individual variations across human ears prevent a hearing instrument from performing optimally on a given individual, as the hearing aid parameters typically are based on an average human or obtained from a dummy head and torso (a model). For example, the size of the individual ear will alter the acoustic properties around the ear as well as the placement of the hearing instrument behind the ear. Modern receiver-in-the ear BTE hearing aids (cf. e.g. FIG. 1A, 1B) comprises or consists of a behind-the-ear part as well as a speaker unit, connecting the BTE part with the speaker located in the ear canal. In order to compensate for different ear sizes, different speaker unit sizes (lengths) can be selected. By selecting the correct (physical) size of the speaker unit, it is to some extent possible to ensure that the BTE instrument is mounted at the correct (optimal) location behind the ear.

However, not all acoustic parameters can fully be compensated by selecting an optimal speaker unit. In addition, due to variations in production, speaker units specified to have a certain size (e.g. cable length) also vary in the specified length (the cable being e.g. specified to have a length of 50 mm, but in practice to vary between 48 mm and 52 mm). Thus, two speaker unit samples specified to have the same size may in fact vary in length with up to several millimetres.

SUMMARY

The terms 'hearing instrument' and 'hearing aid' are used interchangeably in the present disclosure without any intended difference in meaning.

The term 'speaker unit size' is in the present context taken to refer a length of the (flexible) cable and the speaker unit housing (e.g. from a connection of the cable to the BTE-part to a distal end (sound outlet) of the speaker unit housing), or only to the length of the cable, which typically reflect the variable parameter. The term 'speaker unit size' may refer to different physical sizes, which may vary by having different discrete lengths of the cable. The hearing care professional (HCP) or the end user may have a finite number ($N_{SPU}$) of speaker unit sizes to choose between. The speaker unit sizes may e.g. be numbered, e.g. i=1, 2, . . . , $N_{SPU}$, where 1 and $N_{SPU}$ refers to the shortest and longest cable length ($L_{SPU,i}$), respectively. The total number ($N_{SPU}$) of speaker unit sizes (and hence speaker unit lengths ($L_{SPU,i}$), i=1, . . . , $N_{SPU}$) may e.g. be larger than 3, e.g. in a range between 3 and 10, e.g. 5.

A First Hearing Aid:

In a first aspect of the present application, a hearing aid adapted to be worn at an ear of a user is provided. The hearing aid comprises

- a multitude of microphones, each being adapted to pick up sound from an environment around the user and to provide an electric input signal representative of said sound;
- a processor configured to apply one or more processing algorithms to the multitude of electric input signals or to a signal or signals originating therefrom and to provide a processed signal in dependence of said multitude of electric input signals, the processor comprising
- a feedback control system for estimating a feedback path from said output transducer to at least one of said multitude of microphones;
- an output transducer for converting said processed signal to an acoustic signal;
- a BTE-part adapted for being located at or behind the ear of the user, the BTE part comprising at least one of said multitude of microphones; and
- a speaker unit adapted to be located at least partly in an ear canal of the user, the speaker unit comprising said output transducer and a cable electrically connecting said BTE-part and said output transducer.

The processor may be configured to estimate a speaker unit size in dependence of said estimated feedback path.

Thereby a hearing aid with personalized processing may be provided.

The terms 'hearing instrument' and 'hearing aid' are used interchangeably in the present disclosure without any intended difference in meaning.

The measured speaker unit size may e.g. be stored in the hearing aid or transmitted to an auxiliary device (e.g. another hearing aid of a binaural hearing aid system, or a processing device, or a charging station, or to a device comprising an APP for controlling the hearing aid (system), etc.).

The feedback path from the output transducer to at least one of the multitude of microphones may be represented by an impulse response or an acoustic transfer function.

An acoustic delay of the feedback path may be represented by a finite impulse response filter with a certain group delay. The group delay may be derived from a certain frequency range, e.g. frequencies below 1000 Hz, frequencies below 2000 Hz, frequencies below 3000 Hz, or frequencies below 5000 Hz, or frequencies between 500 Hz and 1500 Hz or the frequencies ranging between 500 Hz and 2000 Hz.

The feedback path may be estimated, while the hearing aid is located in a specific position away from the user's head. The specific position may be a case adapted to mechanically receive the BTE-part of the hearing aid (e.g. while the speaker-unit is un-supported).

The feedback path may be estimated, while the hearing aid is located in a charging station. The charging station may (in a charging mode of operation) be configured to charge a rechargeable battery of the hearing aid, e.g. via charging contacts, e.g. located on the BTE-part, or by wireless charging.

The hearing aid and the charging station may (in a feedback path measurement mode) be configured to communicate while the feedback path(s) is(are) being measured and the results thereof to be stored in memory of the hearing aid or the charging station.

The hearing aid may be configured to determine whether it is placed in an open or a closed charging station in dependence of a measured feedback path (open or closed being e.g. defined in relation to the hearing aid being located in a closed or open cavity (e.g. an open or closed box).

The (measured) feedback path, e.g. the group delay (or an acoustic distance between the output transducer and a microphone during measurement of the feedback path) may be logged in the hearing aid or in the charging station. The group delay and/or another representation of the impulse response or transfer function may e.g. be stored in memory of the hearing aid or in the charging station every time the hearing instrument is mounted in the charger. Based on the thus logged data differences from one measurement to the following measurement can be evaluated, e.g. to detect if the acoustic distance has changed between two measurements. A changed acoustic distance may indicate that the speaker unit has been replaced or bend.

The hearing aid may comprise a user interface. The measurement of group delay or acoustic distance (or the feedback path) may e.g. be initiated from an APP of an auxiliary device, e.g. a smartphone. The initiation of the measurement may depend on the background sound level, such that the measurement is only initiated if the ambient sound level is below a predefined threshold.

The speaker unit may comprise the output transducer and a cable electrically connecting the input transducer and the BTE-part. The speaker unit may comprise one or more of the multitude of microphones, e.g. an environment facing microphone.

One of the one or more processing algorithms may comprise a directional algorithm and the processor may be configured to provide optimized parameters of the directional algorithm based on the estimated speaker unit size. The processor may comprise a directional system for applying a directional algorithm to the multitude of electric input signals and provide a beamformed signal in dependence of the multitude of electric input signals and configurable directional parameters. The optimized parameters of the directional system may comprise a steering vector or beamformer weights of a particular beamformer. The optimized parameters of the directional system may be estimated from an average of acoustic transfer functions across a group of people all having been fitted with a specific speaker unit size.

The hearing aid may be configured to provide the estimated speaker unit size based on a database of corresponding known values of assigned speaker unit sizes (i=1, 2, . . . , $N_{SPU}$), and optionally bends (($b_{i,q}$), q=1, . . . , $N_{bend,i}$), and measured feedback paths ($FBP_{i,q}$) for one or more, e.g. all, microphones of the hearing aid, or of a pair of hearing aids of a binaural hearing aid system. $N_{SPU}$ is the number of different speaker units connectable to the BTE-part. $N_{SPU}$ may e.g. be less than 10, e.g. in a range between 3 and 8. $N_{bend,i}$ is the number of different bends (see e.g. FIG. 2A) for a given speaker unit length i. $FBP_{i,q}$ represents the feedback path (or a derived parameter) for the $i^{th}$ speaker unit and the $q^{th}$ bend (for a given microphone).

A Second Hearing Aid:

In a second aspect a hearing aid adapted to be worn at an ear of a user is provided by the present disclosure. The hearing aid comprises

- a microphone adapted to pick up sound from an environment around the user and to provide an electric input signal representative of said sound;
- a processor configured to apply one or more processing algorithms to the electric input signal or to a signal or signals originating therefrom and to provide a processed signal in dependence of said electric input signal and processing parameters of said one or more processing algorithms,
- an output transducer for converting said processed signal to an acoustic signal;
- a BTE-part adapted for being located at or behind the ear of the user, the BTE part comprising said microphone; and
- a speaker unit adapted to be located at least partly in an ear canal of the user, the speaker unit comprising said output transducer and a cable electrically connecting said BTE-part and said output transducer;
- wherein the processor comprises a feedback control system for estimating a feedback path from said output transducer to at least one of said multitude of microphones; and
- wherein the processor is configured to estimate optimized processing parameters related to the acoustic properties of said ear of the user for said one or more processing algorithms in dependence of said estimated feedback path.

The hearing aid may comprise a multitude of microphones, each being adapted to pick up sound from an environment around the user and to provide an electric input signal representative of the sound.

The processor may comprise a directional system for applying a directional algorithm to the multitude of electric input signals and provide a beamformed signal in dependence of the multitude of electric input signals and configurable directional parameters, and wherein the one or more processing algorithms comprises the directional algorithm, and wherein the optimized processing parameters related to the acoustic properties of the ear of the user comprises the configurable directional parameters (cf. e.g. FIG. 6D).

The optimized processing parameters may comprise one or more of specific relative acoustic transfer functions used to define one or more of a) a target direction for a listener, e.g. a steering or look vector parameter in an MVDR beamformer, b) a set of fixed beamformer weights, such as fixed beamformer weights for a hyper-cardioid or a beamformer having its null(s) towards a specific direction(s).

The hearing aid may be configured to provide the optimized processing parameters related to the acoustic properties of the ear of the user for one of the one or more processing algorithms based on a database of corresponding known values of

- measured feedback paths ($FBP_{i,q}$) for one or more, e.g. all, microphones of the hearing aid, or of a pair of hearing aids of a binaural hearing aid system for different artificial or natural persons, and
- associated optimized parameters for the one of said one or more processing algorithms for said different artificial or natural persons.

The hearing aid may comprise a speaker unit adapted to be located at least partly in an ear canal of the user, the speaker unit comprising the output transducer and a cable electrically connecting said BTE-part and the output transducer, and wherein the processor is configured to estimate a speaker unit size in dependence of the estimated feedback path.

The processor may be configured to estimate optimized processing parameters related to the acoustic properties of the ear of the user for the one or more processing algorithms in dependence of the speaker unit size.

A method of equivalent scope as the hearing aid of the second aspect may be provided by substituting structural features with corresponding method steps.

A Third Hearing Aid:

In a third aspect, a hearing aid adapted to be worn at an ear of a user is provided by the present disclosure. The hearing aid comprises

- at least one microphone adapted to pick up sound from an environment around the user and to provide respective at least one electric input signal representative of said sound;
- a processor configured to apply one or more processing algorithms to the at least one electric input signal or to a signal or signals originating therefrom and to provide a processed signal in dependence of said electric input signal and processing parameters of said one or more processing algorithms, an output transducer for converting said processed signal to an acoustic signal;

a BTE-part adapted for being located at or behind the ear of the user, the BTE part comprising said microphone; and a speaker unit adapted to be located at least partly in an ear canal of the user, the speaker unit comprising said output transducer and a cable electrically connecting said BTE-part and said output transducer, the speaker unit being defined by a speaker unit size;

wherein said processor is configured to estimate optimized processing parameters related to the acoustic properties of said ear of the user for said one or more processing algorithms in dependence of said current speaker unit size.

A method of equivalent scope as the hearing aid of the third aspect may be provided by substituting structural features with corresponding method steps.

It is intended that the following features can be combined with a hearing aid according to any of the abovementioned aspects.

The hearing aid may be constituted by or comprise an air-conduction type hearing aid, a bone-conduction type hearing aid, or a combination thereof.

The hearing aid may be constituted by or comprise a hearing instrument configured compensate for a hearing impairment of the user, a headset, an earphone, an ear protection device or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise the output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit comprises an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology, such as Bluetooth LE Audio), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g, such as less than 5 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a transform unit for converting a time domain signal to a signal in the transform domain (e.g. frequency domain or Laplace domain, Z transform, wavelet transform, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);

b) the current acoustic situation (input level, feedback, etc.), and c) the current mode or state of the user (movement, temperature, cognitive load, etc.);

d) the current mode or state of the hearing aid (program selected, time elapsed since last user interaction, etc.) and/or of another device in communication with the hearing aid.

The classification unit may be based on or comprise a neural network, e.g. a recurrent neural network, e.g. a trained neural network.

The hearing aid comprises an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers (e.g. a microphone array) and a number of output transducers, e.g. one or more loudspeakers, and one or more audio (and possibly video) transmitters e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing aid adapted to be worn at an ear of a user is provided. The hearing aid comprises a multitude of microphones, each being adapted to pick up sound from an environment around the user and to provide an electric input signal representative of said sound; and an output transducer for converting a processed signal depending on said multitude of electric input signals to an acoustic signal;

a BTE-part adapted for being located at or behind the ear of the user, the BTE part comprising at least one of said multitude of microphones; and a speaker unit adapted to be located at least partly in an ear canal of the user, the speaker unit comprising said output transducer and a cable electrically connecting said BTE-part and said output transducer.

The Method Comprises applying one or more processing algorithms to the multitude of electric input signals or to a signal or signals originating therefrom and providing said processed signal in dependence of said multitude of electric input signals; and estimating a feedback path from said output transducer to at least one of said multitude of microphones.

The method may further comprise estimating a speaker unit size in dependence of said estimated feedback path.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The method may comprise the step of providing the estimated speaker unit size based on a database of corresponding known values of assigned speaker unit sizes (i=1, 2, . . . , $N_{SPU}$), and optionally bends (($b_{i,q}$), q=1, . . . , $N_{bend,i}$), and measured feedback paths ($FBP_{i,q}$) for one or more, e.g. all, microphones of the hearing aid, or of a pair of hearing aids of a binaural hearing aid system.

The method may comprise that the feedback path is estimated, while the hearing aid is located in a specific position away from the user's head.

The method may comprise the step of providing optimized parameters to at least one of said one or more processing algorithms in dependence of said estimated speaker unit size.

The method may comprise the step of applying a directional algorithm to said multitude of electric input signals and providing a beamformed signal in dependence of said multitude of electric input signals and configurable directional parameters and providing optimized parameters of the directional algorithm based on the said estimated speaker unit size.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may be constituted by or comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth (e.g. Bluetooth LE Audio) or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC, a wireless microphone, etc.) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system. In case of own voice, where we need to select from which instrument to transmit own voice to the phone, in case the user have different speaker units on each side, we could make the selection based on which instrument has the shorter speaker unit.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

Embodiments of the disclosure may e.g. be useful in applications such as hearing aids comprising a behind-the-ear part as well as an exchangeable speaker unit located in the ear canal.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present applicant relates to the field of hearing aids, in particular to a hearing aid comprising a directional system (beamforming). The disclosure comprises a scheme for personalizing parameters of the directional system.

Figure 1A:
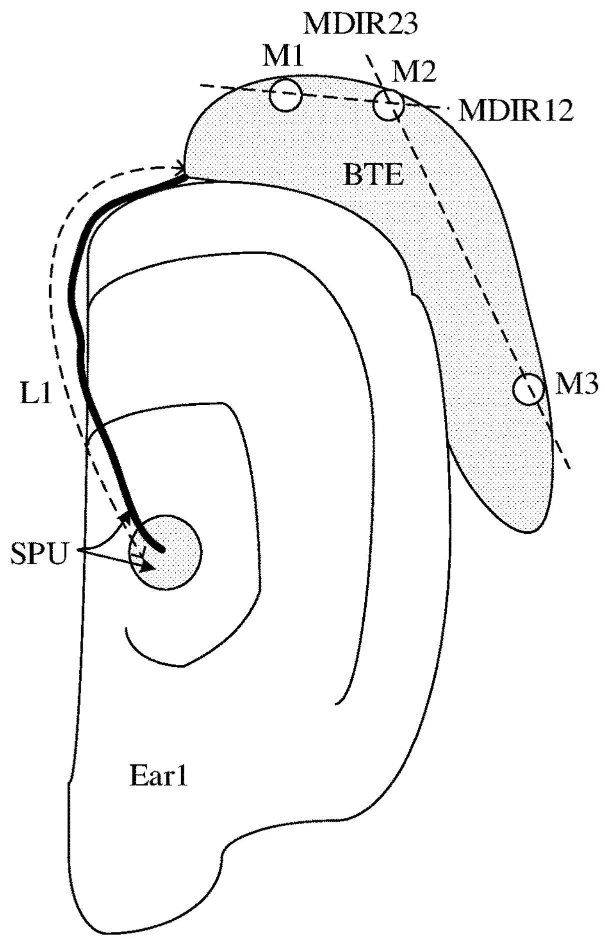
FIG. 1A shows an example of a first receiver-in-the ear BTE hearing instrument located at a first ear of a first user.
Figure 1B:
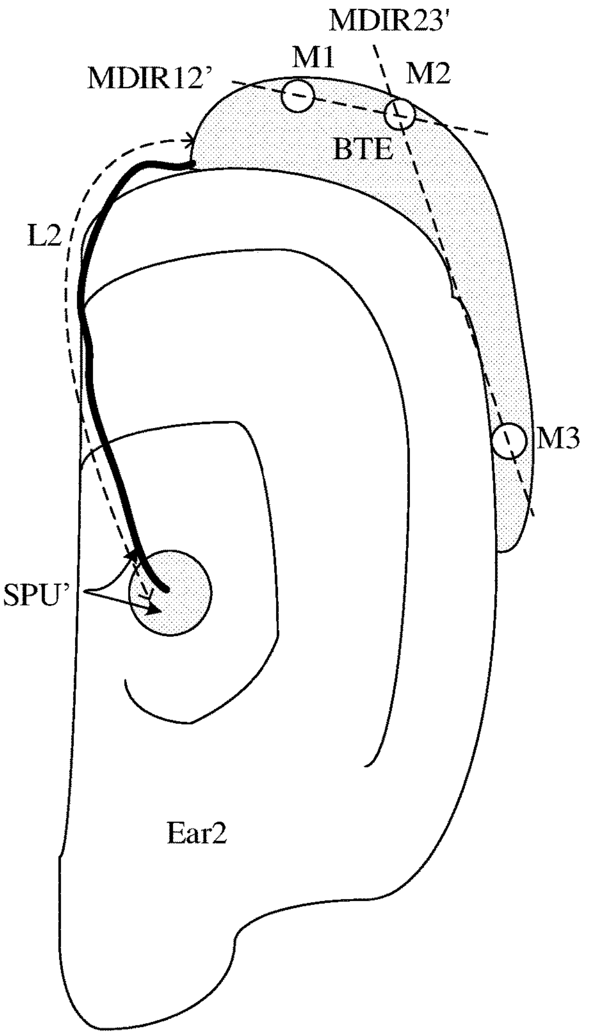
FIG. 1B shows an example of a second receiver-in-the ear BTE hearing instrument located at a second (larger) ear of a second user.

FIG. 1A shows an example of a first receiver-in-the ear BTE hearing instrument located at a first ear (Ear1) of a first user. FIG. 1B shows an example of a second receiver-in-the ear BTE hearing instrument located at a second (larger) ear (Ear2) of a second user. Each hearing instrument comprises a BTE-part adapted for being located at or behind the ear (Ear1, Ear2) of the respective user. The BTE part comprises (at least two, here) three (first, second and third) microphones (M1, M2, M3). The three microphones are positioned so that the first and second microphones (M1, M2) are located at the top of the BTE-part and the third microphone (M3) is located below the first and second microphones (when the user is wearing the hearing instrument). The first and second microphones (M1, M2) are located on a first microphone axis (MDIR12, MDIR12' in FIGS. 1A and 1B, respectively) that may be intended to be horizontal, when the user wears the hearing instrument in an upright position (e.g. standing, or sitting). The second and third microphones (M2, M3) are located on a second microphone axis (MDIR23, MDIR23' in FIGS. 1A and 1B, respectively) that is intended to have an angle (e.g. between 30° and 80°) with the first (preferably horizontal) microphone axis, when the user wears the hearing instrument in an upright position (e.g. standing, or sitting).

The hearing instruments of FIGS. 1A and 1B each comprises a speaker unit (SPU) adapted to be located at least partly in an ear canal of the respective user. The speaker unit (SPU) comprises an output transducer (e.g. a loudspeaker, cf. e.g. FIG. 2A, 2B) for playing sound to the user and a cable for electrically connecting the BTE-part and the output transducer (and possible other components located in the speaker unit (SPU). Due to individual differences and different ear sizes (Ear1, Ear2), different individuals need different speaker unit sizes (e.g. defined by cable lengths, L, cf. L1<L2 as indicated by dashed double arrows in FIGS. 1A and 1B, respectively) in order to ensure that a BTE hearing instrument is optimally mounted. Optimal mounting may e.g. be defined by two microphones of a BTE-part being located on a common horizontal axis, when the user is standing (upright). Speaker units (SPU) are typically produced with discrete (cable/wire) lengths, where the discrete steps of wire lengths are around 6 mm. The individual variations make it difficult to find a single set of parameters, which ensure an optimal performance of e.g. a directional noise reduction system across all individuals. Especially in the case, where a hearing instrument contains more than two microphones, such as 3 microphones (M1, M2, M3), or more, as illustrated in FIG. 1A, 1B, the importance of individual parameterization of acoustic parameters increases.

The embodiments of FIGS. 1A and 1B are different in that the size (e.g. the cable lengths) of the respective speaker units for the first and second hearing instruments are different, to adapt to different size of ears of the first and second user. The size of the speaker unit (SPU) of the embodiment of FIG. 1B is larger than the size of the speaker unit (SPU) of the embodiment of FIG. 1A to adapt to the fact that the second ear (Ear2) is larger than the first ear (Ear1).

The respective microphone directions (MDIR12, MDIR12' and MDIR23, MDIR23') may be different from ideal (and possibly different from each other (e.g. MDIR12≠MDIR12' and MDIR23≠MDIR23')) due to less-than-ideal matching of the speaker unit size to the physiognomy (e.g. size) of the respective first and second ears (Ear1, Ear2). This may e.g. result in less-than-ideal directional parameters governing one or more beamformers of the directional system.

The present disclosure contains two different proposals for a solution as outlined in the following.

One proposal is related to automatically detecting the size of a speaker unit (e.g. its length). The other proposal is related to using knowledge of the speaker unit in order to optimize the acoustic parameters for the individual.

Estimation of Speaker Unit Size/Speaker Unit Length:

We propose (as an example) to estimate the speaker unit size based on the measured acoustic distance between the loudspeaker and the hearing aid microphone(s). The acoustic distance may be derived from the estimated feedback path. The feedback path can be regarded as a finite impulse response filter with a certain group delay ($d_i$). The group delay will directly depend on the acoustic distance between the loudspeaker and the ear (where the microphones are typically positioned). The longer the distance between the loudspeaker and the microphones, the higher delay.

Figure 1C:
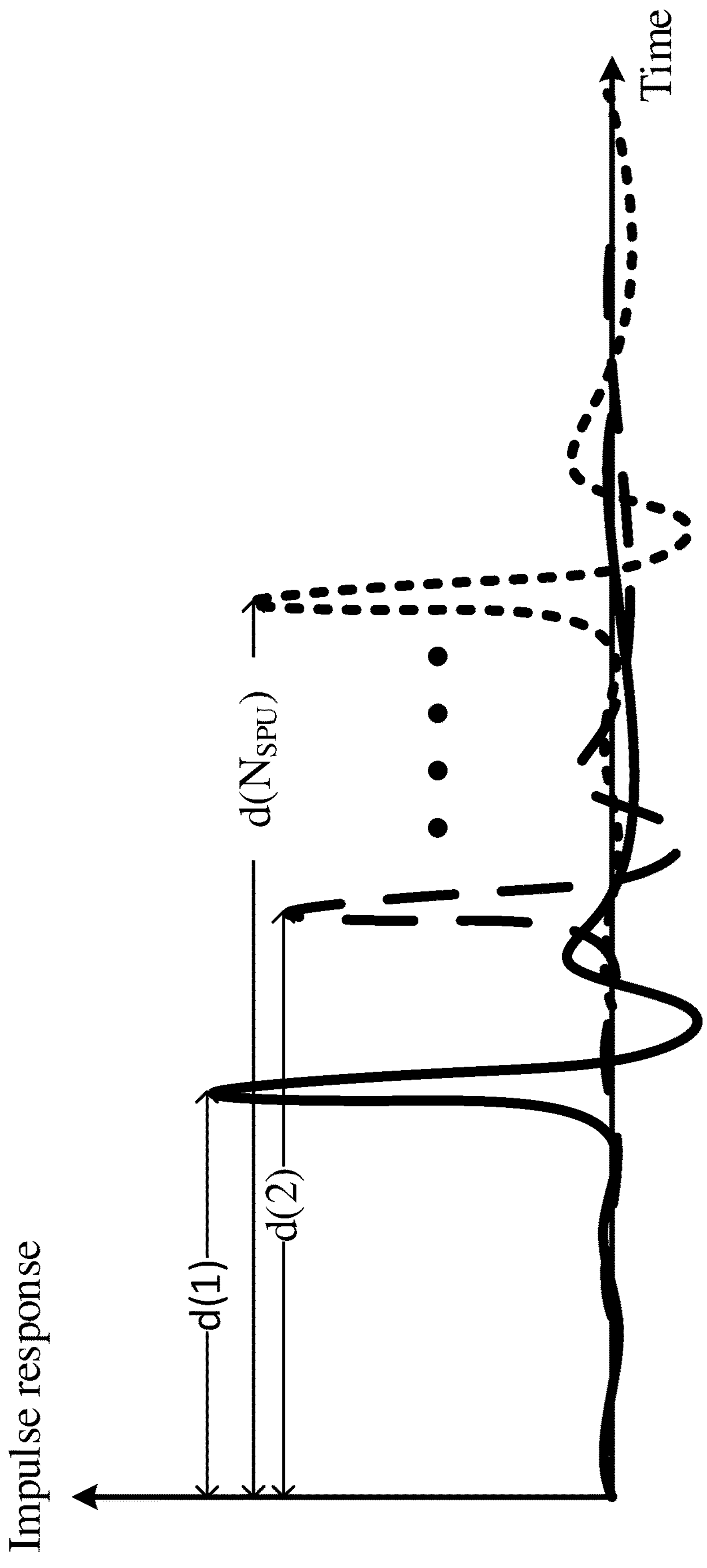
FIG. 1C schematically illustrates examples of respective impulse responses for a number of different speaker units (SPUi, i=1, 2, . . . , $N_{SPU}$)

FIG. 1C schematically illustrates examples of respective impulse responses for a number of different speaker units (SPUi, i=1, 2, . . . , $N_{SPU}$). The group delay (denoted d(i) in FIG. 1C and $d_i$ in the description, i=1, 2, $N_{SPU}$) is indicated in FIG. 1C as the delay from time t=0 to the first (largest) peak of the impulse response in question. The group delay (d(i), $d_i$) is shown to increase with size of the speaker unit from i=1 to i=$N_{SPU}$, increasing index i representing larger size of the speaker unit (e.g. larger cable length).

As the acoustic distance also may depend on how the speaker unit (e.g. the cable) is bend, it may be advantageous to measure the feedback path/acoustic distance in a situation, where the speaker unit is not exposed to mechanical stress.

The impulse responses (and hence the group delay (d(i), $d_i$)) may e.g. be determined in advance of use of the hearing instruments for a multitude of different speaker unit sizes (cable lengths) ($d_i(L_i)$), and a multitude of bends ($b_{i,q}$) of the cable ($d_i(L_i, b_{i,q})$, i=1, 2, . . . , $N_{SPU}$, q=1, . . . , $N_{bend}$).

The term 'bend' (described by parameter 'b') may in the present context be taken to mean a measure of the deviation of the cable of a speaker unit from a straight line. The term 'bend' may e.g. be represented by the length (L) of the cable of the speaker unit relative to the direct (linear) distance between the distal end of the loudspeaker outlet and a microphone inlet of the hearing instrument (e.g. when the hearing instrument is mounted on the user, or arranged in a storage box or charging station (adapted to receive the BTE-part of the hearing instrument)). The term 'bend' may alternatively be measured as a deviation compared to a "reference bend" of a nominal speaker unit.

A database of corresponding (known) values of assigned speaker unit sizes (i=1, 2, . . . , $N_{SPU}$), bends (($b_{i,q}$), q=1, . . . , $N_{bend,i}$) and measured group delays ($d_{i,q}$) and/or feedback paths ($FBP_{i,q}$) for one or more (e.g. all) microphones of the hearing instrument (or of a pair of hearing instruments of a binaural hearing aid system, cf. FIGS. 2A, 2B and 4A, 4B) may be generated.

The database may be used to generate a look-up table for translating a given measured group-delay or feedback path to an estimated speaker unit size (i*) and optionally bend (b*). The data of the (ground truth) database may be grouped according to group delay or feedback path, so that data entries having group delays or feedback paths around given values ($d_i$*, $FBP_i$*), e.g. with predefined distance (Δd, ΔFBP), are assigned to the group delays or feedback paths ($d_i$*, $FBP_i$*) in question. The size (and optionally a bend) of an unknown speaker unit may be estimated by determining a distance (e.g. an Euclidian distance) between a given current estimated group-delay or feedback path and (e.g. all or a selected subset of) records of group delays or feedback paths of the database as the size (and optionally a bend) associated with the data record having the smallest distance. The database may (further or alternatively) constitute or form part of a training database for a neural network for estimating (outputs of the neural network:) a speaker unit size (i*) and optionally bend (b*) based on (inputs to the neural network:) a current group delay and/or feedback path (for at least one, such as all microphones of the hearing instrument, or of a pair of hearing instruments of a binaural hearing aid system). The outputs of the neural network may alternatively comprise speaker unit position compared to a reference speaker unit position (while mounted in a charger).

The training database may be used to train the neural network to provide optimized parameters in an iterative procedure involving a cost function (e.g. MSE).

Figure 2B:
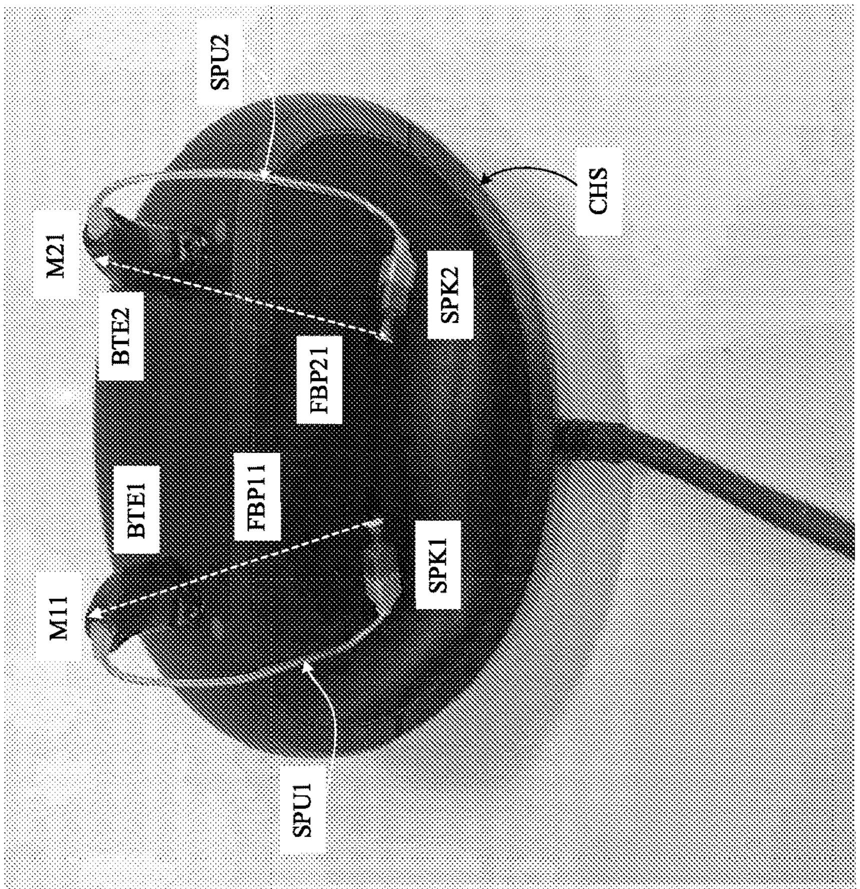
FIG. 2A, 2B shows a first exemplary setup for measuring the acoustic propagation delay between the loudspeaker of the speaker unit and the microphones of the BTE-part of the hearing instrument while being mounted in a charger.
Figure 2A:
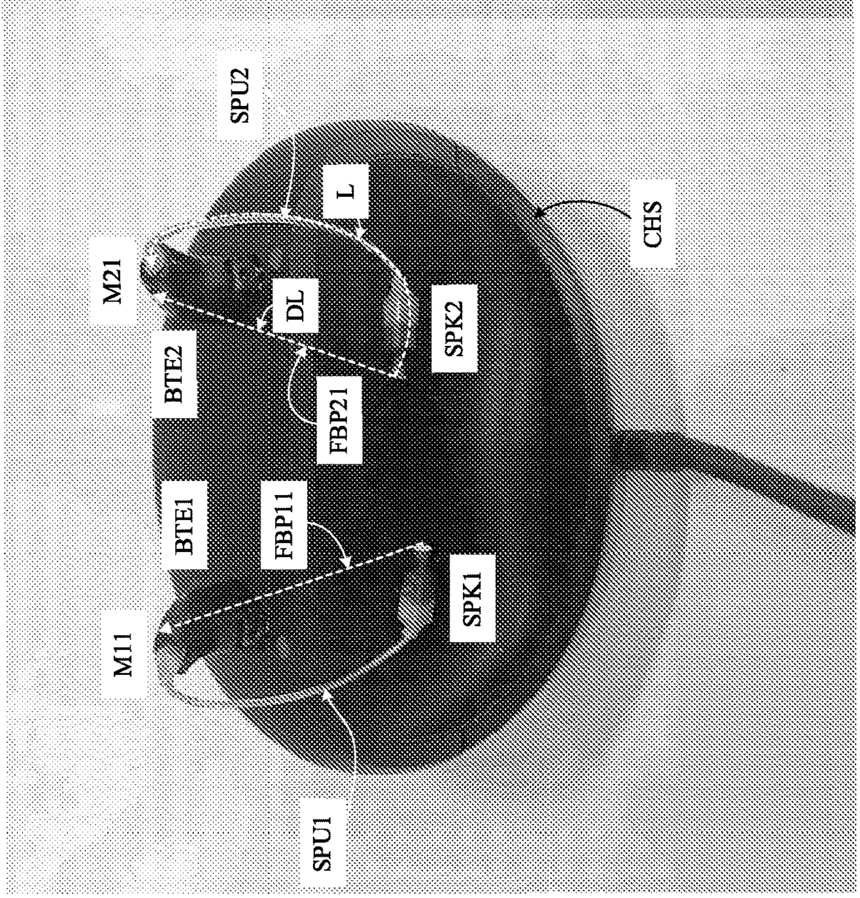

For the database, the group delay and/or the feedback path may be measured 1) while the hearing instrument is worn as intended by a model of a human head (e.g. a HATS model) (cf. FIG. 1A, 6A), or 2) while located in a storage box or charger specifically adapted to receive and fixate the BTE-part of the hearing instrument in a reproducible manner (cf. e.g. FIG. 2A, 2B).

When the hearing instrument has been assigned to a particular user, the group delay and/or the feedback path may be measured 1) while the hearing instrument(s) is(are) worn as intended by the user (cf. FIG. 1A, 6A), or 2) while located in a storage box or charger specifically adapted to receive and fixate the BTE-part(s) of the hearing instrument(s) in a reproducible manner (cf. e.g. FIG. 2A, 2B).

As a first example, the feedback path is estimated while the hearing instrument is mounted in a charger. This is illustrated in FIG. 2A, 2B.

FIG. 2A, 2B each show a first exemplary setup for measuring the acoustic propagation delay between the loudspeaker (SPK1, SPK2) of the speaker unit (SPU1, SPU2) and the microphones (M11, M21) of the BTE-part (BTE1, BTE2) of first and second hearing instruments (e.g. of a binaural hearing aid system) while being mounted in a charging station (CHS). The acoustic delay/distance may e.g. be derived from a feedback path measurement (FBP11, FBP21), cf. e.g. FIG. 1C. The estimated delay (or direct distance (DL) between the loudspeaker (e.g. SPK2) and the microphone (e.g. M21) in question) can be used to automatically detect the size (e.g. represented by the physical 'length' (L) of the speaker unit (e.g. SPU2) (or a code, e.g. a number i=1, 2, . . . , $N_{SPU}$) assigned to such length), or even measure the deviation from a nominal speaker unit with a given length. The left-hand picture (FIG. 2A) shows two speaker units of size '2' and the right-hand picture (FIG. 2B) shows two speaker units of (larger) size '3'.

Measuring the feedback path (FBP11, FBP21, e.g. represented by a group delay of the impulse response (see e.g. FIG. 1C), or a transfer function from the loudspeaker to a given microphone), e.g. every time the hearing instrument is mounted in the charger, makes it possible to detect differences from one measurement to the following measurement, and e.g. detect if the acoustic distance has changed between two measurements. A changed acoustic distance may indicate that the speaker unit has been replaced or bend. The hearing aid and/or the charging station may be configured to log (store in memory) the measured feedback paths, or parameters derived therefrom.

In a further alternative setup, the hearing instruments may be located in a charger comprising a closed cavity. The hearing instrument may be configured as well may take into account whether it is placed in an open or a closed charger, e.g. based on characteristics of the measured feedback paths, as the feedback paths may look quite different in the two setups.

As a second example, the feedback path is measured in-situ, i.e. while the instrument is mounted at the ear.

The measurement of acoustic distance may e.g. be initiated from an APP. Or it may be initiated (e.g. automatically) after the instrument has been mounted in the charger. The initiation of the measurement may depend on the background sound level, such that the measurement is only initiated if the ambient sound level is below a predefined threshold.

The group delay of a feedback path may contain information about the size of the user's ear (the higher group delay, the bigger ear), and it may thus be used as input to selecting the hearing aid parameters related to the acoustic properties of the ear.

In an embodiment, the group delay is derived from a certain frequency range. E.g. frequencies below 1000 Hz, frequencies below 2000 Hz, frequencies below 3000 Hz, frequencies below 5000 Hz, frequencies between 500-1500 Hz or the frequencies ranging between 500-2000 Hz.

Figure 3:
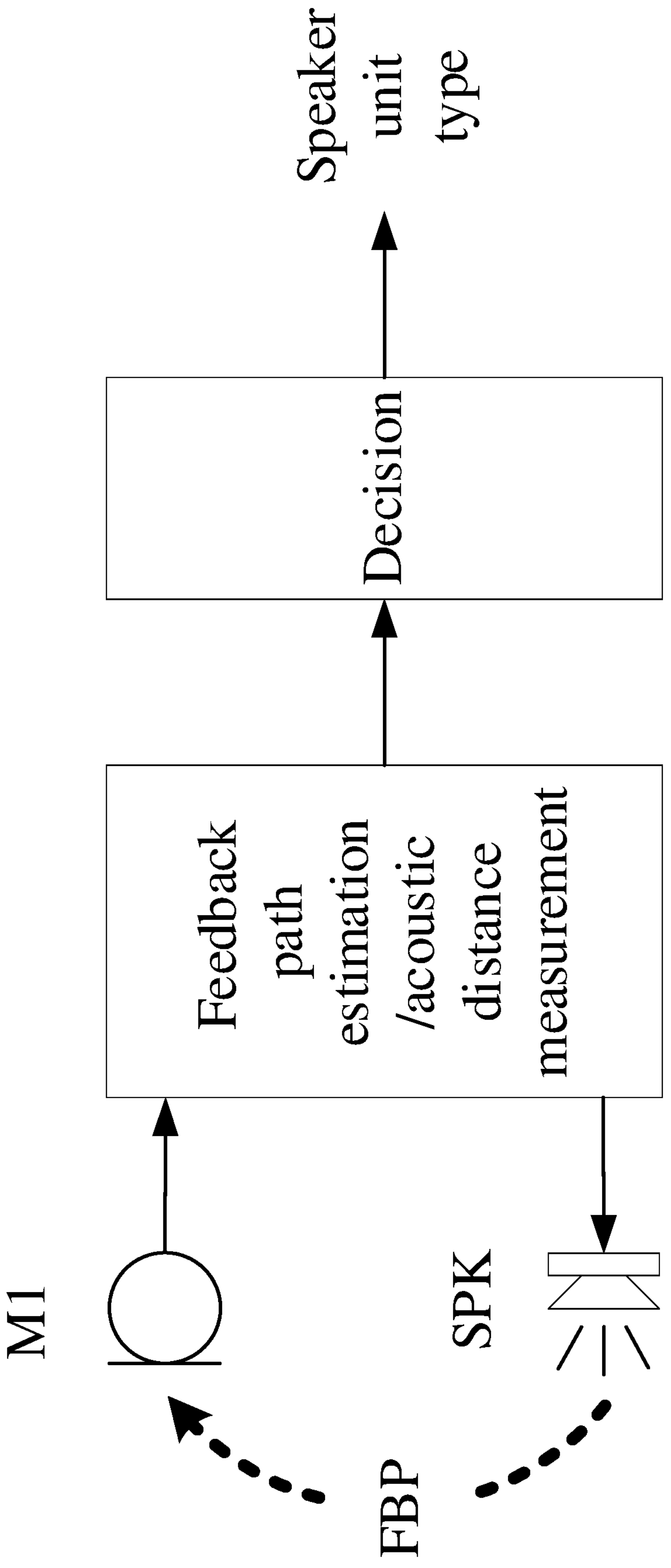
FIG. 3 shows a second exemplary setup for measuring the acoustic propagation delay between the loudspeaker of the speaker unit and the microphones of the BTE-part of the hearing instrument, e.g. while being mounted at the ear of the user.

As shown in FIG. 3, a measured feedback path (or a measured acoustic distance) may be used to classify the speaker unit, e.g. determine the size (e.g. the length of the cable) of the speaker unit. The classification may be based on simple thresholds based on the expected acoustic distance for different speaker unit lengths. The classification may also be based on a neural network, e.g. trained on a dataset of measured feedback paths with corresponding speaker unit size (e.g. the corresponding speaker unit (cable) length).

The (intermediate) step of extracting the acoustic distance may be avoided. Acoustic distance can be regarded as a kind of feature extraction based on the feedback path, but it could be that we hereby have discarded some other useful information from the feedback path besides the acoustic distance. See also later in connection with FIG. 6.

FIG. 3 shows a second exemplary setup for measuring the acoustic propagation delay between the loudspeaker (SPK) of the speaker unit (SPU) and the microphones (M1) of the BTE-part of the hearing instrument, e.g. while being mounted at the ear of the user (or while located in a storage box or charging station). By transmitting and recording audio, the propagation delay between the speaker and the microphone may be estimated. Based on the transmitted and measured signal, the transfer function (FBP) between the loudspeaker (SPK) and the microphone(s) (M1), i.e. the feedback path, may be estimated (cf. block 'Feedback path estimation/acoustic distance measurement' in FIG. 3). The feedback path may be estimated by playing a deterministic sound from the loudspeaker (SPK). The feedback path filter coefficients may be estimated as the filter minimizing an error, such as a least means square error, (cf. signals $E_i$ i=1, . . . , M in FIG. 6D) between the measured microphone signal and the filter convolved with the loudspeaker signal (e.g. 'OUT' in FIG. 6D).

Alternatively, we may simply derive the acoustic transmission delay between the speaker (SPK) and the microphone (M1) directly. By correlating the loudspeaker signal with the microphone signals, we may estimate the delay from the time lag corresponding to the maximum correlation coefficient, or from the group delay of the correlation function.

Based on the measured feedback path or the estimated delay, we may classify the currently mounted speaker unit type (cf. block 'Decision (classify)' in FIG. 3), whose output (Speaker unit type) represents the speaker unit size.

The measurement signal played back via the speaker unit (SPK (SPU) in FIG. 3) may be a broadband signal, such as a white noise, signal or a pink noise signal. The signal may be a deterministic white noise sequence. Alternatively, the audio signal may be a sine sweep, an MLS sequence, a single or multiple sine tones.

As different speaker units (e.g. the cable of the speaker unit) may be bend in different ways, the distance from the speaker unit to the microphones may vary, even though the speaker unit length is exactly the same. For that reason, it may be advantageous to estimate not only the transfer function between a speaker and a single microphone, but the transfer function between the speaker and all the available microphones, even the microphones of the contralateral hearing aid, e.g. while placed in the charger or a storage box with known geometric distances (and/or angles) between the microphones, when the hearing instrument(s) is(are) located in the 'box' in question). This is exemplified in FIG. 4A, 4B.

Figure 4A:
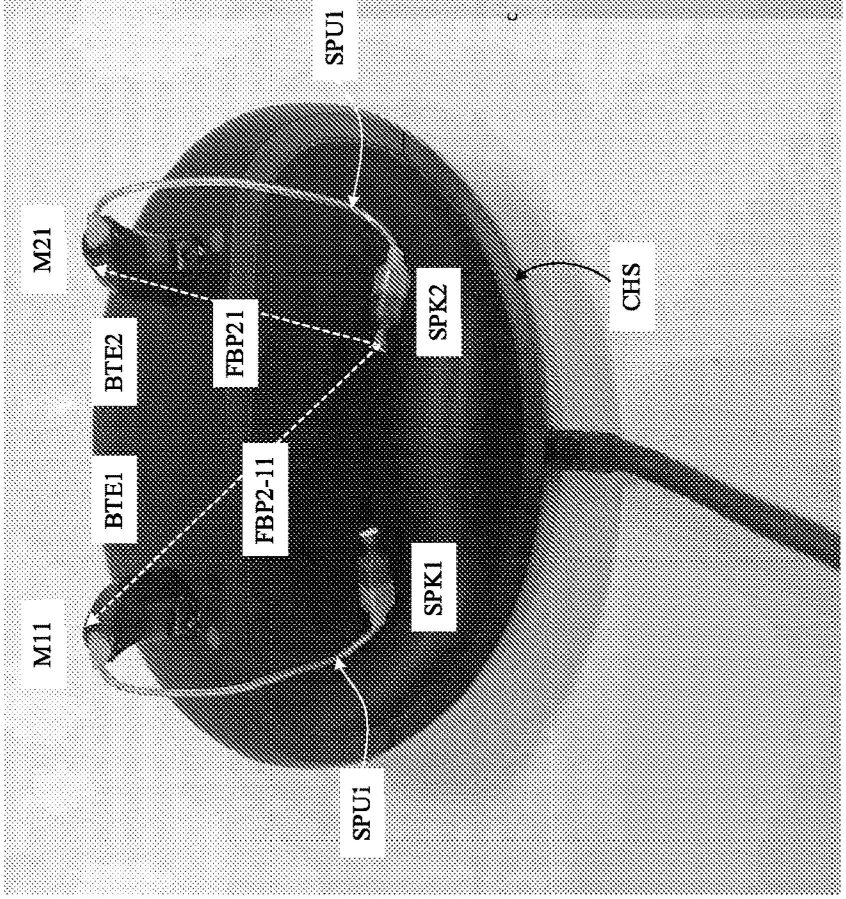
FIG. 4A, 4B shows<a third exemplary setup for measuring the acoustic propagation delay between the loudspeaker of the speaker unit and all available microphones the microphones of the BTE-part(s) of the hearing instrument(s) while being mounted in a charger.
Figure 4B:
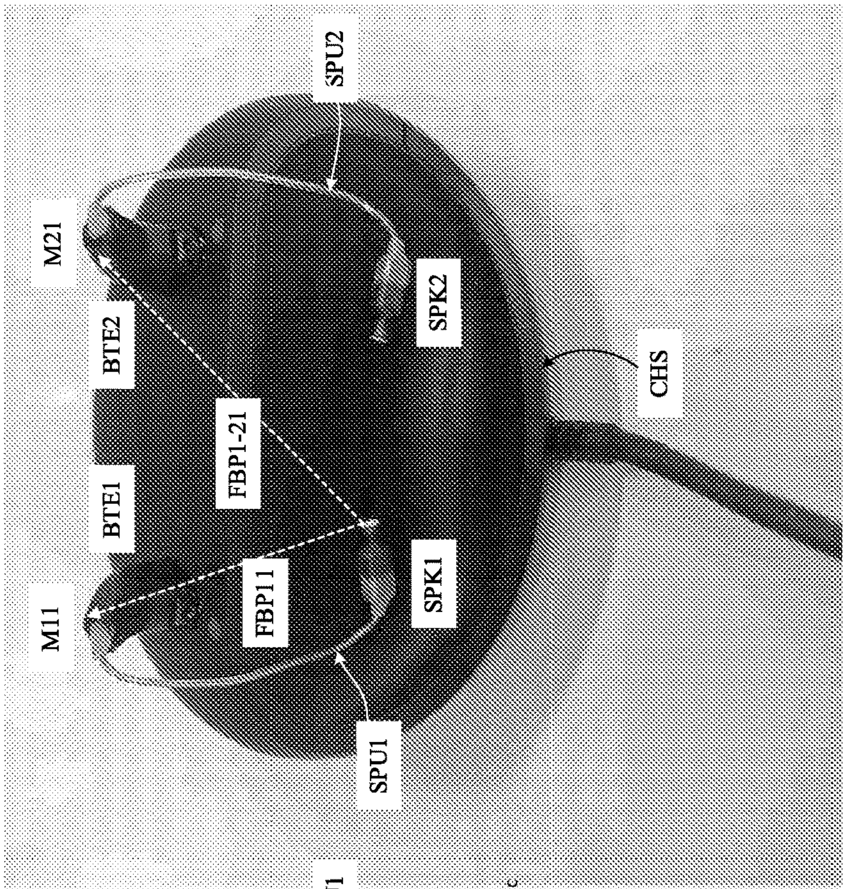

FIG. 4A, 4B shows a third exemplary setup for measuring the acoustic propagation delay between the loudspeaker (SPK1, SPK2) of the speaker unit (SPU1, SPU2) and all available microphones (M11, M12) of the BTE-part(s) (BTE1, BTE2) of the hearing instrument(s) while being mounted in a charger (CHS). As the clocks in the hearing instruments are (typically) synchronized, the across-instrument transfer function may be measured in addition to the local feedback path (and the results thereof compared in a processor of one or both hearing instruments). When playing an audio signal from the speaker (e.g. SPK2 in FIG. 4A) at one instrument, we may not only be able to measure the acoustic propagation delay from the hearing aid speaker (e.g. SPK2) to the hearing aid's own microphones (e.g. M21), but also estimate the acoustic propagation delay from the speaker (e.g. SPK2) to the contralateral hearing aid's microphones (e.g. M11), while both instruments are mounted in the charger (CHS). FIG. 4A illustrates measurements based on sound from the loudspeaker (SPK2) of the second hearing instrument, whereas FIG. 4B illustrates measurements based on sound from the loudspeaker (SPK1) of the first hearing instrument.

By measuring several distances, we can better take into account if a speaker unit has a different bend compared to another speaker unit, even though they may have similar lengths. The bend may be extracted from the differences between the measured distances between the sound from the speaker arriving at the two microphones.

In FIG. 4A, 4B, it may be assumed that the BTE parts of the two hearing aids are at fixed positions. Hence, by knowing the distances from the speaker to each of the microphones, it is possible to estimate the exact position of the speaker. The position of the speaker may be compared to the position of a nominal reference speaker unit in order to estimate the deviation compared to a nominal bend. The bend may as well be logged over time in order to assess if the bend (or the position of the speaker) has changed compared to the previous measurement.

In addition, we may be able to verify whether the speaker unit (SPU1, SPU2) (specifically the loudspeaker (SPK1, SPK2) of the speaker unit) is at a similar location as last time the hearing instrument was charged. A change in feedback path (FBP2-11, FBP21 in FIG. 4A, and FBP11, FBP1-21 in FIG. 4B), when mounted in the charging station (CHS) would indicate a different bend of the cable or that the speaker unit (SPU1, SPU2) has been replaced, and we may thus be able to monitor if the feedback paths change over time. A change of feedback path over time may indicate that the speaker unit need to be replaced with a new speaker unit. When measuring cross—instrument transfer functions (FBP2-11 in FIG. 4A, and FBP1-21 in FIG. 4*b*), it may be advantageous that the playback signal is deterministic, such that it is possible to correlate the recorded microphone signals with the same known transmitted signals in both hearing aids (in order to estimate the feedback paths).

Access to the cross-instrument transfer functions (FBP2-11, FBP1-21) may be used to assess if the speaker units are correctly placed after the instruments are mounted in the charger. As the distance between the two instruments is fixed, also the distance between the speaker in one instrument to the microphones in the opposite hearing instrument is supposed to be fixed. Hereby it is possible to determine if the locally measured feedback path (FBP21 in FIG. 4A and FBP11 in FIG. 4B) is valid. The more microphones we have, the better access we have to estimating the location of the speaker unit (loudspeaker) relative to the microphones.

Adjusting Acoustic Parameters Based on Speaker Unit Length:

Given the speaker unit size (e.g. the cable length) (either from an automatic estimation of the size) or by reading the information from the speaker unit (if possible) or by manually typing in the size, it is possible to group people who have more similar acoustic properties compared to an average hearing aid user (with any speaker unit). It may therefore be advantageous to fit some hearing aid parameters based on the selected speaker unit length. Such parameters may e.g. be specific relative transfer functions used to define the target direction for a listener (i.e. the steering/look vector parameter in an MVDR beamformer, or in more general terms be the direction in which the impinging signal at a reference microphone is unaltered). It may also be a set of fixed beamformer weights, such as fixed beamformer weights for a hyper-cardioid or a beamformer having its null(s) towards specific directions. Such weights may be estimated from an average of acoustic transfer functions across a group of people all having been fitted with a specific speaker unit length.

Figure 5:
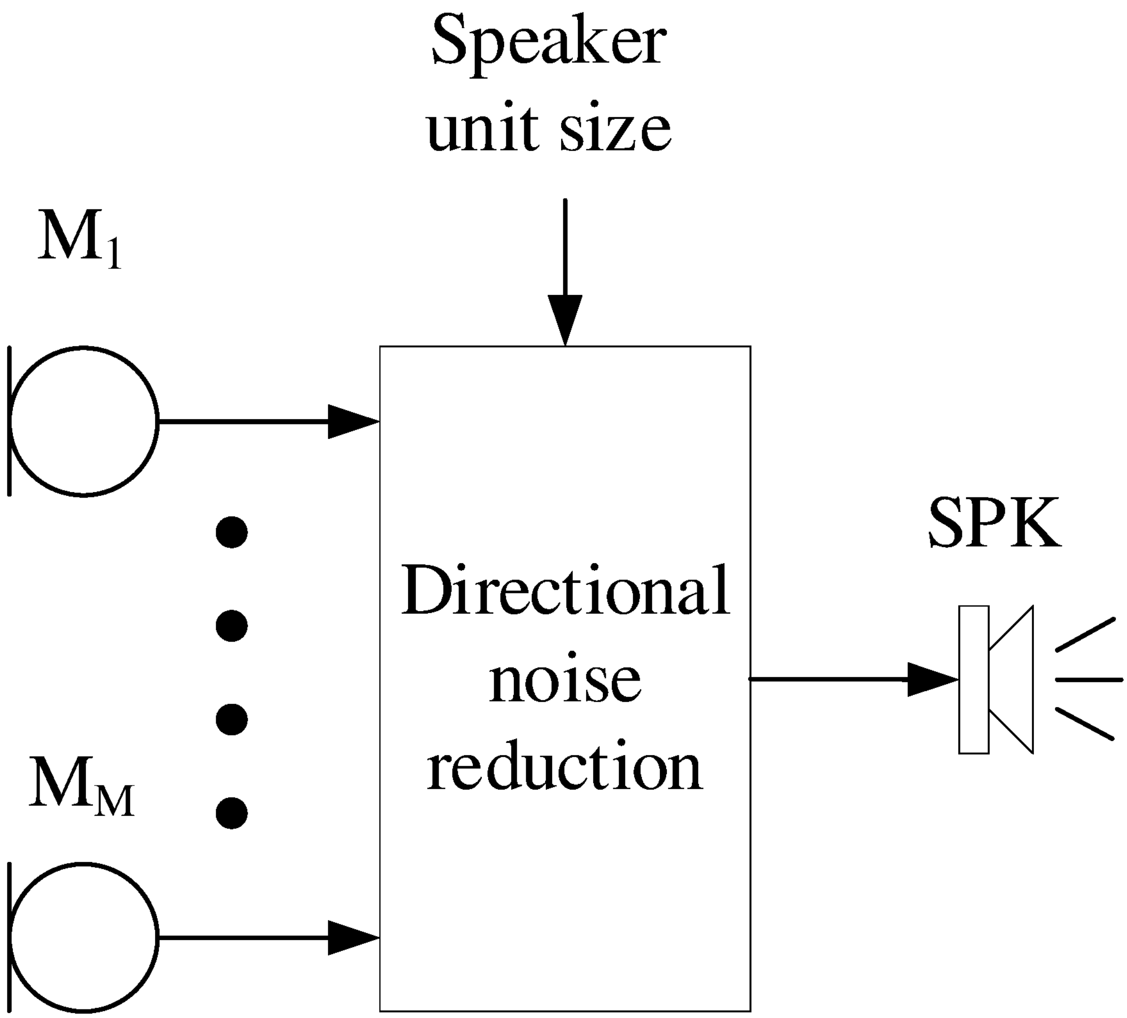
FIG. 5 shows an embodiment of a hearing aid where the selected speaker unit size is used to fit specific acoustically related parameters, in a noise reduction system.

FIG. 5 shows an embodiment of a hearing aid according to the present disclosure, wherein the selected speaker unit size (e.g. based on the cable length) is used to fit specific acoustically related parameters, in a (directional) noise reduction system. The steering vector of an MVDR beamformer may e.g. be determined (influenced) in dependence of the speaker unit size. Especially when the hearing instrument contains more than 2 microphones (here M microphones ($M_1, \ldots, M_M$), where M may be larger than 2), an individual fit of directional parameters for the 'Directional noise reduction' system becomes important. In the embodiment of FIG. 5 the hearing aid is shown to comprise a forward path comprising a multitude of M microphones ($M_1, \ldots, M_M$), a directional noise reduction system ('Directional noise reduction') for attenuating noise in the signal(s) picked up by the microphones, and a loudspeaker (SPK) for presenting sound with improved acoustic properties to the user (reduced noise). The hearing aid may further comprise an algorithm for applying a frequency and level dependent gain to a signal of the forward path to compensate for a hearing impairment if the user (cf. e.g. hearing aid processor (HAP) in FIG. 6D).

Figure 6A:
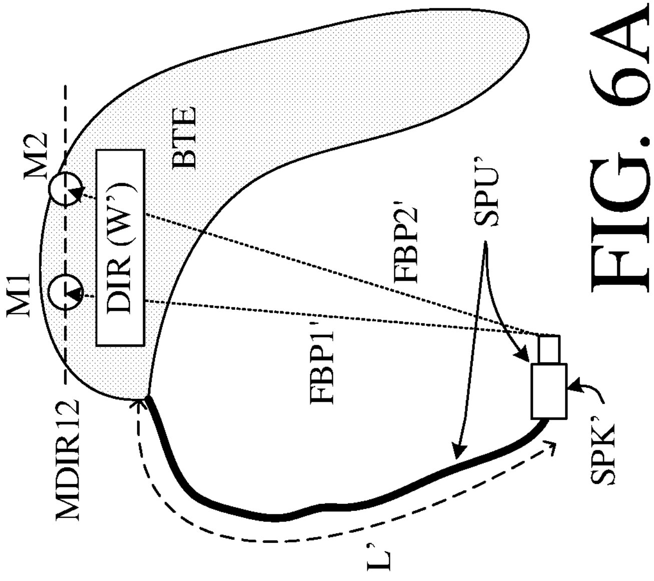
FIG. 6A shows<a BTE-style hearing instrument comprising a speaker unit with a loudspeaker adapted for being located in an ear canal of the user.

FIG. 6A shows a BTE-style hearing aid comprising a speaker unit (SPU') with a loudspeaker (SPK') adapted for being located in an ear canal of the user. The hearing aid comprises a BTE-part (BTE) adapted for being located at or behind an ear of the user electrically connected to the speaker unit (SPU') via matching connectors of the BTE-part and the speaker unit (e.g. of the plug and socket type). The speaker unit (SPU') comprises the output transducer (SPK') and an electric cable electrically connecting the BTE-part and the output transducer. The electric cable comprises a number of electric wires (e.g. directly) connected to the output transducer (SPK') (and to possible other electronic components of the speaker unit (SPU'), e.g. integrated with the output transducer (SPK)) and to outputs of the BTE-part, e.g. via the electric connectors. The length (represented by parameter L' indicated by dashed double-arrow in FIG. 6A) of the electric cable may characterize the speaker unit size. A number of speaker units of varying size (e.g. cable length) may be connectable to the BTE-part. The BTE-part comprises two microphones (M1, M2) located on (or defining) a microphone axis (cf. dashed line (denoted MDIR12) through the two microphones (M1, M2) in FIG. 6A). The microphone axis is preferably pointing in a forward direction of a horizontal plane when mounted as intended on the user's head. Thereby forward and backwards pointing beamformers maybe provided on the basis of the two electric input signals provided by the microphones and parameters of respective beamformers of a directional system (DIR (W')) of the hearing aid. An acoustic propagation path (the feedback path) from the loudspeaker (SPK') to each of the microphones (M1, M2) of the BTE-part is indicated (cf. dotted arrows denoted FBP1, FBP2 in FIG. 6A).

Figure 6B:
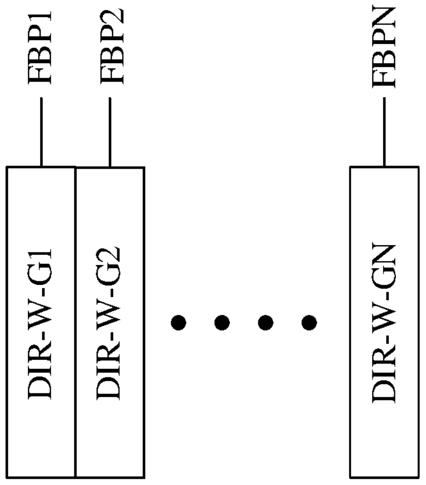
FIG. 6B shows a labelled training data set for a (current) feedback path estimate to directional weights classifier.
Figure 6C:
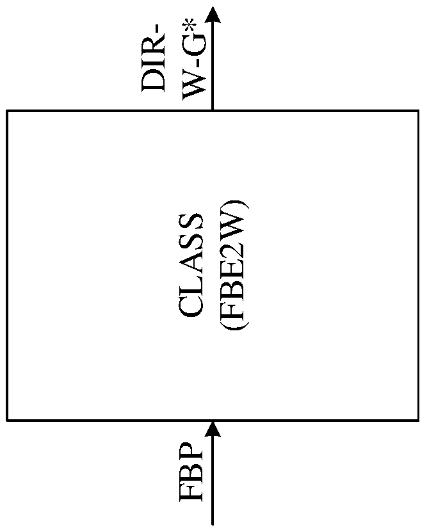
FIG. 6C shows a feedback path estimation to directional weight classifier.
Figure 6D:
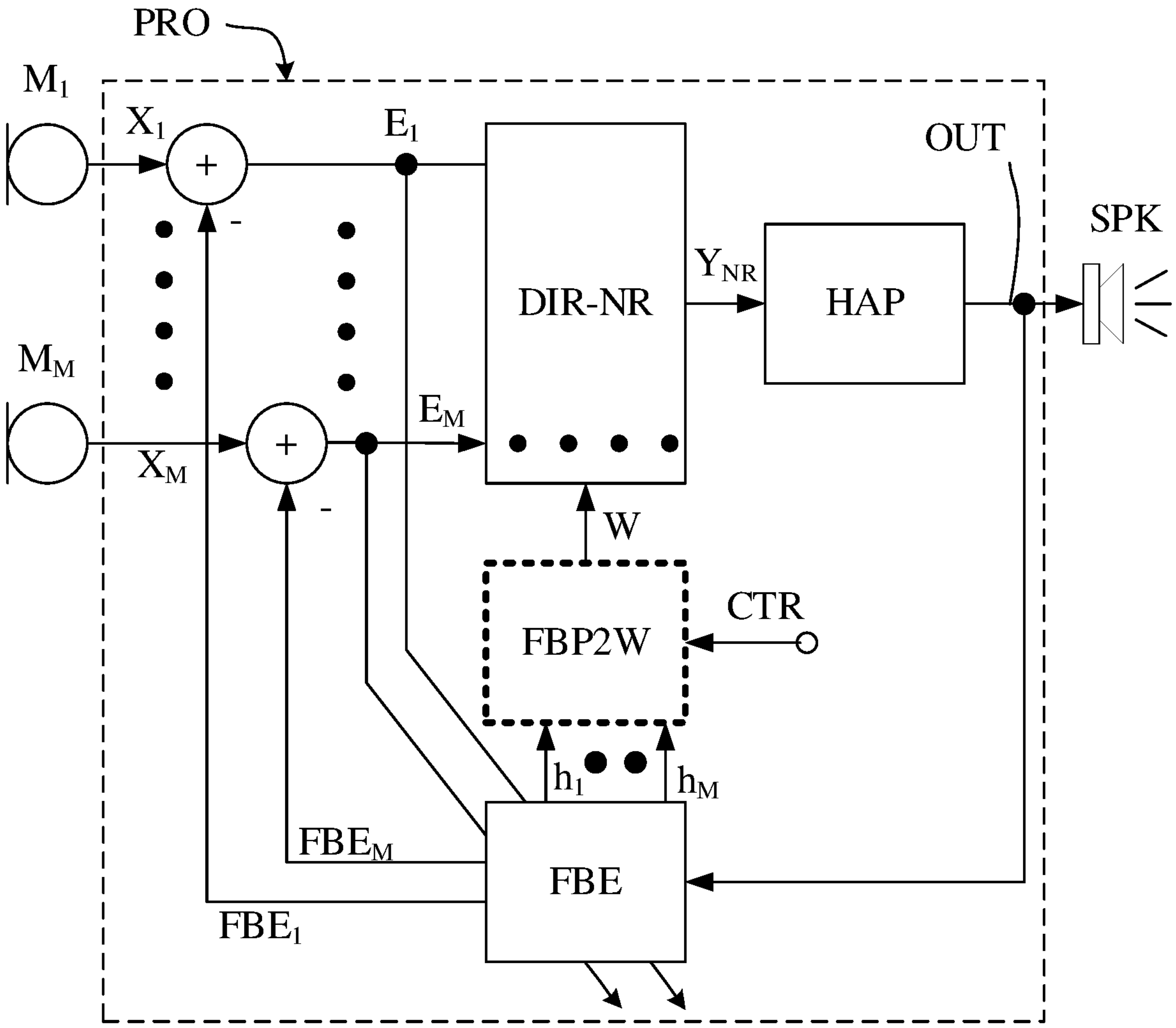
FIG. 6D shows a hearing aid comprising a directional system according to an embodiment of the present disclosure.

FIG. 6B shows a labelled training data set for a (current) feedback path estimate (FBPx) to directional weights (Wx) classifier (cf. 'CLASS (FBE2 W)' in FIG. 6C, 6D). A database of corresponding (known) values of assigned individually adapted directional weights (Wx) and feedback paths ($FBP_{i,q}$) for one or more (e.g. all) microphones of the hearing instrument (or of a pair of hearing instruments of a binaural hearing aid system may be generated. The database may be used to generate a look-up table for translating a given measured feedback path (FBPx) to estimated directional weights (Wx). The data of the (ground truth) database may be grouped according to feedback path (FBPx, x=1, 2, . . . , N), so that data entries (directional weights (Wx)) having feedback paths around given values ($FBP_x$*), e.g. with predefined distance (ΔFBP) between $FBP_x$ and $FBP_{x-1}$ or $FBP_{x+1}$, are assigned to the group delays or feedback paths ($FBP_x$*) in question. The values of directional weights (Wx) of a given configuration comprising an unknown speaker unit may be estimated by determining a distance (e.g. an Euclidian distance) between a given current estimated feedback path and (e.g. all or a selected subset of) records of group feedback paths of the database as the values of directional weights (Wx) associated with the feedback path ($FBP_x$*), having the smallest distance. The database may (further or alternatively) constitute or form part of a training database for a neural network for estimating (outputs of the neural network:) directional weights (Wx*) based on (inputs to the neural network:) a feedback path (for at least one, such as all microphones of the hearing instrument, or of a pair of hearing instruments of a binaural hearing aid system). The training database may be used to train the neural network to provide optimized parameters in an iterative procedure involving a cost function (e.g. MSE).

FIG. 6C schematically shows inputs in the form of a current feedback path (FBP, cf. also estimated feedback paths $h_1, \ldots, h_M$ for the M microphones in FIG. 6D) estimated by the hearing aid and outputs in the form of estimated directional weights (Wx*) of a feedback path estimation to directional weight classifier ('CLASS (FBE2W)' in FIG. 6C, 6D).

FIG. 6D shows a hearing aid adapted to be worn at an ear of a user comprising a directional system according to an embodiment of the present disclosure. The hearing aid comprises a multitude (M, M≥2) of microphones ($M_1, \ldots, M_M$) adapted to pick up sound from an environment around the user and to provide an electric input signal ($X_1, \ldots, X_M$) representative of the sound. The hearing aid comprises a BTE-part adapted for being located at or behind the ear of the user (cf. FIG. 6A). The BTE part comprises at least one (e.g. all) of the multitude of microphones ($M_1, \ldots, M_M$). The electric input signals ($X_1, \ldots, X_M$) may be in the form of frequency sub-band signals provided by respective analysis filter banks connected to each microphone. The hearing aid comprises a processor (PRO) configured to apply one or more processing algorithms to the electric input signals ($X_1, \ldots, X_M$) or to a signal or signals originating therefrom and to provide a processed signal (OUT) in dependence of the electric input signals and processing parameters of the one or more processing algorithms. The hearing aid further comprises an output transducer (here a loudspeaker, SPK) for converting the processed signal OUT) to an acoustic signal. The hearing aid comprises a speaker unit (SPU') adapted to be located at least partly in an ear canal of the user (cf. FIG. 6A) the speaker unit comprises the output transducer (SPK) and a cable electrically connecting the BTE-part and the output transducer. The processor (PRO) comprises a feedback control system (FBE, '+') for estimating a feedback path ($h_1, \ldots, h_M$) from the output transducer (SPK) to at least one (e.g. all) of the multitude of microphones ($M_1, \ldots, M_M$). The feedback estimation unit (FBE) provides as outputs estimates ($FBE_1, \ldots, FBE_M$) of the current feedback signal based on the current reference signal (OUT) fed to the output transducer (SPK). The feedback estimation unit (FBE) provides estimated feedback transfer functions (feedback paths) ($h_1, \ldots, h_M$) by minimizing the error signals (feedback corrected input signals) ($E_1, \ldots, E_M$) in view of the current reference signal (OUT) using an adaptive algorithm (e.g. an LMS algorithm, or similar). The feedback control system comprises respective M subtraction units for subtracting current estimates of the feedback signals ($FBE_1, \ldots, FBE_M$) from the current electric input signals ($X_1, \ldots, X_M$), thereby providing the respective feedback corrected input signals ($E_1, \ldots, E_M$). The processor (PRO) is configured to estimate optimized processing parameters related to the acoustic properties of the ear of the user for the one or more processing algorithms in dependence of the estimated feedback path(s) ($h_1, \ldots, h_M$). In the embodiment of FIG. 6D, the processor comprises a directional noise reduction system (DIR-NR) comprising one or more beamformers for providing a spatially filtered signal ($Y_{NR}$) in dependence of the electric input signals (here the feedback corrected electric input signals ($E_1, \ldots, E_M$) and (optimized) directional weights (W) provided by a feedback-to-directional-weights-classifier (cf. dashed enclosure denoted 'FBE2W' in FIG. 6D). The optimized directional weights (W) provided by the feedback-to-directional-weights-classifier (FBE2W) based on the currently estimated feedback path(s) ($h_1, \ldots, h_M$), as discussed in connection with FIG. 6B. The feedback-to-directional-weights-classifier (FBE2W) may e.g. be activated during power-up and/or fitting of the hearing aid to the user (or on user demand, e.g. from a user interface, e.g. an APP, of the hearing aid). The activation of the feedback-to-directional-weights-classifier (FBE2W) is controlled by control signal (CTR). When activated, a specific signal may be played by the output transducer, such signal being particularly suitable for accurate feedback estimation (e.g. a white noise signal). The hearing aid further comprises a hearing aid processor (HAP) for applying a level and frequency dependent gain to a signal of the forward audio path of the hearing aid, here to the noise reduced signal ($Y_{NR}$) from the directional noise reduction system (DIR-NR). Thereby a hearing impairment of the user may be at least compensated.

It is intended that the structural features of the aids described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure.

The previous description is provided to enable any person skilled in the art to practice the various aspects described herein. Various modifications to these aspects will be readily apparent to those skilled in the art.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

US2020322736A1 (Oticon) 08.10.2020

The invention claimed is:

1. A hearing aid adapted to be worn at an ear of a user, the hearing aid comprising:

- a microphone adapted to pick up sound from an environment around the user and to provide an electric input signal representative of said sound;
- a processor configured to apply one or more processing algorithms to the electric input signal or to a signal or signals originating therefrom and to provide a processed signal in dependence of said electric input signal and processing parameters of said one or more processing algorithms,
- an output transducer for converting said processed signal to an acoustic signal;
- a BTE-part adapted for being located at or behind the ear of the user, the BTE part comprising said microphone; and
- a speaker unit adapted to be located at least partly in an ear canal of the user, the speaker unit comprising said output transducer and a cable electrically connecting said BTE-part and said output transducer;
- wherein the processor comprises a feedback control system for estimating a feedback path from said output transducer to at least one of said multitude of microphones; and wherein the processor is configured to estimate optimized processing parameters related to the acoustic properties of said ear of the user for said one or more processing algorithms in dependence of said estimated feedback path, wherein said optimized processing parameters comprise one or more of specific relative acoustic transfer functions used to define a target direction for a listener, a steering or look vector parameter in an MVDR beamformer, a set of fixed beamformer weights, such as fixed beamformer weights for a hyper-cardioid or a beamformer having its null(s) towards a specific direction(s).

2. A hearing aid according to claim 1 comprising a multitude of microphones, each being adapted to pick up sound from an environment around the user and to provide an electric input signal representative of said sound.

3. A hearing aid according to claim 1 wherein said processor comprises a directional system for applying a directional algorithm to said multitude of electric input signals and provide a beamformed signal in dependence of said multitude of electric input signals and configurable directional parameters, and wherein said one or more processing algorithms comprises said directional algorithm, and wherein said optimized processing parameters related to the acoustic properties of said ear of the user comprises said configurable directional parameters.

4. A hearing aid adapted to be worn at an ear of a user, the hearing aid comprising:

a microphone adapted to pick up sound from an environment around the user and to provide an electric input signal representative of said sound;

a processor configured to apply one or more processing algorithms to the electric input signal or to a signal or signals originating therefrom and to provide a processed signal in dependence of said electric input signal and processing parameters of said one or more processing algorithms, an output transducer for converting said processed signal to an acoustic signal;

a BTE-part adapted for being located at or behind the ear of the user, the BTE part comprising said microphone; and a speaker unit adapted to be located at least partly in an ear canal of the user, the speaker unit comprising said output transducer and a cable electrically connecting said BTE-part and said output transducer;

wherein the processor comprises a feedback control system for estimating a feedback path from said output transducer to at least one of said multitude of microphones; and wherein the processor is configured to estimate optimized processing parameters related to the acoustic properties of said ear of the user for said one or more processing algorithms in dependence of said estimated feedback path the hearing aid being configured to provide said optimized processing parameters related to the acoustic properties of said ear of the user for one of said one or more processing algorithms based on a database of corresponding known values of:

measured feedback paths for one or more microphones of the hearing aid, or of a pair of hearing aids of a binaural hearing aid system for different artificial or natural persons, and associated optimized parameters for said one of said one or more processing algorithms for said different artificial or natural persons.

5. A hearing aid according to claim 4, the hearing aid further comprising a multitude of microphones, each being adapted to pick up sound from an environment around the user and to provide an electric input signal representative of said sound.

6. A hearing aid according to claim 4, wherein said processor comprises a directional system for applying a directional algorithm to said multitude of electric input signals and provide a beamformed signal in dependence of said multitude of electric input signals and configurable directional parameters, and wherein said one or more processing algorithms comprises said directional algorithm, and wherein said optimized processing parameters related to the acoustic properties of said ear of the user comprises said configurable directional parameters.

7. A hearing aid adapted to be worn at an ear of a user, the hearing aid comprising:

at least one microphone adapted to pick up sound from an environment around the user and to provide respective at least one electric input signal representative of said sound;

a processor configured to apply one or more processing algorithms to the at least one electric input signal or to a signal or signals originating therefrom and to provide a processed signal in dependence of said electric input signal and processing parameters of said one or more processing algorithms, an output transducer for converting said processed signal to an acoustic signal;

a BTE-part adapted for being located at or behind the ear of the user, the BTE part comprising said microphone; and a speaker unit adapted to be located at least partly in an ear canal of the user, the speaker unit comprising said output transducer and a cable electrically connecting said BTE-part and said output transducer, the speaker unit being defined by a speaker unit size;

wherein said processor is configured to estimate optimized processing parameters related to the acoustic properties of said ear of the user for said one or more processing algorithms in dependence of said current speaker unit size, wherein said optimized processing parameters comprise one or more of specific relative acoustic transfer functions used to define a target direction for a listener, e.g. a steering or look vector parameter in an MVDR beamformer, a set of fixed beamformer weights, such as fixed beamformer weights for a hyper-cardioid or a beamformer having its null(s) towards a specific direction(s).

* * * * *